July 4, 1961
A. C. ALLEN ET AL
2,991,395
SPEED RESPONSIVE CONTROL DEVICE
Filed Oct. 4, 1956
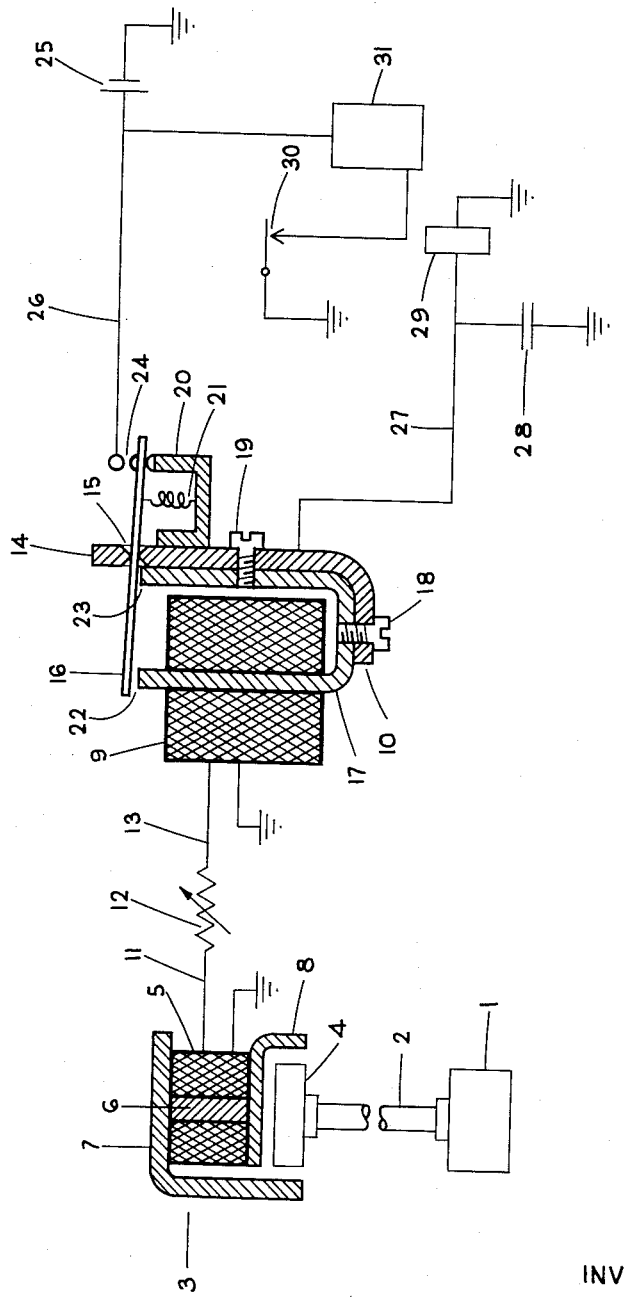
INVENTORS
ARTHUR C. ALLEN
THOMAS E. BJORN
BERNARD J. SADOFF, JR.
BY *John C Black*
ATTORNEY United States Patent Office 2,991,395
Patented July 4, 1961

2,991,395
SPEED RESPONSIVE CONTROL DEVICE
Arthur C. Allen, Chicago, Thomas E. Bjorn, Waukegan, and Bernard J. Sadoff, Jr., Chicago, Ill., assignors to Stewart-Warner Corporation, Chicago, Ill., a corporation of Virginia
Filed Oct. 4, 1956, Ser. No. 613,947
5 Claims. (Cl. 317—5)

This invention relates to speed responsive apparatus and more particularly to apparatus for performing control functions when a rotating body to which it is operatively connected reaches a predetermined speed.

During the course of developing commercially satisfactory speed warning devices and governors for vehicles and vehicle engines, the inventors herein were faced with the same problem which has plagued engineers in this field since the early beginnings of this art—i.e. the development of a speed responsive device positively effective at and above a predetermined vehicle (or engine) speed, and at the same time sufficiently sensitive to be ineffective as soon as vehicle (or engine) speed falls an almost immeasurable minute amount below said predetermined speed. For ease of explanation, this problem will be referred to hereinafter as loopless operation.

To achieve this loopless operation which has never before been achieved so far as is known, the inventors herein fell upon a novel new approach to the problem. Briefly, it was concluded that, if a relay could be controlled by an A.C. generator the current output of which was proportional in frequency and amplitude to the vehicle speed such that the armature of the relay would vibrate in synchronism with the current pulses without operating contacts on the relay until the peak amplitude of the pulses reached a predetermined minimum value, then the normal characteristic of a conventional, inexpensive D.C. relay to require a substantial decrease in current below that required for operation of the relay to permit restoration, could be avoided. By selecting a conventional relay having a natural mechanical resonant frequency substantially higher than the highest frequency normally produced by the current generator, this result was achieved. Then by connecting the contacts of said relay so as to fully charge a capacitor upon each closure thereof and by connecting a conventional relay in parallel with said capacitor, it became possible to maintain said last-mentioned relay continuously operated so long as the contacts of said first-mentioned relay cyclically operated. As a result thereof, the speed responsive device displays a loopless operational characteristic, and only the insignificant release time of the continuously operated relay appears as a delay in rendering the device ineffective. This approach also gives rise to an accurate device, easily adjustable over a wide speed range.

Accordingly, it is a primary object of this invention to provide a speed responsive control device which will be accurately rendered effective at and above a predetermined speed and which will be rendered ineffective when the speed falls a minute amount below said predetermined speed.

A further primary object is the provision of a device of the type described in the preceding paragraph which is adjustable.

A feature of the present invention is the provision of an A.C. generator which produces a current proportional in frequency and amplitude to vehicle speed, of a relay connected to said generator and having an armature cyclically operated in synchronism with pulses of current such that contacts controlled thereby will cyclically close at and above a predetermined minimum amplitude of current pulses, and of circuit means including a relay and capacitor connected in parallel for maintaining said last-mentioned relay operated so long as said contacts cyclically operate.

Other objects and features will be apparent upon a perusal of the following description in which the single figure of the drawing shows diagrammatically the preferred embodiment of the speed responsive control device.

An alternating current generator 3 is connected in a well known manner to a rotating body 1 by means of a flexible shaft 2. Said generator 3 is of a conventional type comprising a rectangular permanent magnet 4, rotated by flexible shaft 2 in accordance with the speed of rotating body 1, and a stationary coil 5 having a magnetic core 6 and magnetic L-shaped pole pieces 7 and 8, disposed in proximity to the magnet 4 in such a manner that an alternating current is produced in coil 5 proportional in frequency and amplitude to the speed of rotation of magnet 4.

Coil 5 is connected electrically to a coil 9 of relay 10 by way of conductor 11, variable resistance element 12 and conductor 13, opposite ends of coils 5 and 9 being grounded in a well known manner to complete an electrical circuit.

Relay 10 also comprises an L-shaped mounting bracket 14 of a nonmagnetic material, which bracket has an aperture 15 therethrough to serve as a pivot for a magnetic armature 16. A generally U-shaped magnetic core 17 is secured to mounting bracket 14 in any suitable manner, for example, by screws 18 and 19. The coil 9 is rigidly mounted on the left leg of core 17. A stop 20 integral with mounting bracket 14 is provided for armature 16, and a spring 21 biases the righthand end of armature 16 against stop 20 to maintain small airgaps 22 and 23 between armature 16 and the legs of core 17. The size of spring 21 is selected so as to have a force equal to the force of attraction between core 17 and armature 16 when a pulse of current in coil 9 is of a predetermined amplitude.

Contacts 24 provided on relay 10 are intermittently closed when the current pulses in the coil 9 are of a predetermined amplitude, or greater, to intermittently close a circuit extending from ground through battery 25, conductor 26, contacts 24, armature 16, mounting bracket 14, conductor 27 and capacitor 28 to ground. Because of the low series resistance in said circuit, capacitor 28 charges rapidly and substantially fully upon even the slightest temporary closure of contacts 24. Capacitor 28 can discharge through relay 29 to operate and maintain operated said relay 29 so long as contacts 24 cyclically operate, relay 29 operates contacts 30 to complete a circuit for control equipment 31 which may take any one of several forms, for example, a vehicle speed or engine governing arrangement, or a speed warning device.

Although any one of several conventional well known devices may be used, the A.C. generator 3 and the relay 10 have been shown partially in detail for ease in description.

The variable resistance element 12 provides a means whereby the speed responsive device may be set so as to be rendered effective at any desired predetermined speed of body 1.

While there has been disclosed what is believed to be the preferred embodiment of the invention, it will be understood that various modifications and changes may be made therein; and it is contemplated to cover in the appended claims all such modifications and changes as fall within the true spirit and scope of the invention.

What is claimed is:

1. Apparatus for performing a control function when a rotating body reaches a predetermined minimum speed comprising: a first means operatively connected to the body for producing cyclical energy proportional in amplitude and frequency to the instantaneous speed of said body; a second means connected with said first means, having a mechanical resonant frequency substantially higher than the frequency of said energy at said predetermined speed, and cyclically operated by said energy; the second means including electrical contacts cyclically closed and opened only at and above a predetermined energy amplitude; and a third noncyclical means controlled by said cyclically operated means and rendered effective while said electrical contacts are cyclically effected to open and close.

2. A speed responsive device comprising a generator operatively connected to a rotating body the speed of which is to be detected for producing an alternating current of a frequency and amplitude proportional to the instantaneous speed of said body, an electromagnetic relay mechanically resonant at a frequency higher than the current frequency corresponding to the speed to be detected, a circuit interconnecting the generator and relay, electrical contacts on said electromagnetic relay moved relative to each other cyclically in synchronism with the pulses of said current and cyclically closed only at and above a predetermined amplitude of current, and circuit means rendered effective as long as said contacts cyclically close.

3. The combination claimed in claim 2 together with a variable resistance element connected in said circuit for adjusting the minimum body speed at which said contacts will cyclically close.

4. A speed responsive device comprising a generator operatively connected to a rotating body the speed of which is to be sensed for producing an alternating current of a frequency and amplitude proportional to the instantaneous speed of said body, a relay having a mechanical resonance of a frequency high than the highest frequency normally produced by the generator, a circuit interconnecting the generator and relay, contacts on said relay, the generator and relay having output and operating characteristics such that said contacts will close lightly and periodically in synchronism with the pulses of alternating current only at and above a predetermined speed of said body, and circuit means including a relay connected in parallel with a capacitor and operated continuously so long as said contacts periodically close.

5. The combination claimed in claim 4 together with a variable resistance element connected in the circuit for adjusting the minimum body speed at which the contacts cyclically close and open.

References Cited in the file of this patent

UNITED STATES PATENTS

| | | |
|---|---|---|
| 1,169,713 | Bodde | Jan. 25, 1916 |
| 2,243,911 | Lakatos | June 3, 1941 |
| 2,467,582 | Corkran | Apr. 19, 1949 |
| 2,747,112 | Deziel | May 22, 1956 |

UNITED STATES PATENT OFFICE
CERTIFICATE OF CORRECTION

Patent No. 2,991,395            July 4, 1961

Arthur C. Allen et al.

It is hereby certified that error appears in the above numbered patent requiring correction and that the said Letters Patent should read as corrected below.

Column 4, line 6, for "high" read -- higher --.

Signed and sealed this 12th day of December 1961.

(SEAL)
Attest:

ERNEST W. SWIDER
Attesting Officer

DAVID L. LADD
Commissioner of Patents

USCOMM-DC